United States Patent [19]

Schuhmacher

[11] Patent Number: 5,443,352

[45] Date of Patent: Aug. 22, 1995

[54] COMBINE GRAIN TANK DISCHARGE SYSTEM

[75] Inventor: Ernst Schuhmacher, Homburg-Einoed, Germany

[73] Assignee: Deere & Company, Moline, Ill.

[21] Appl. No.: 369,993

[22] Filed: Jan. 9, 1995

Related U.S. Application Data

[63] Continuation of Ser. No. 994,027, Feb. 8, 1993, abandoned.

[51] Int. Cl.6 .......................... A01D 41/12; B65G 65/46
[52] U.S. Cl. ...................................... 414/526; 198/661; 198/608; 198/550.01; 414/310
[58] Field of Search ............ 414/310, 502, 526; 198/602, 608, 661, 550.01, 601; 222/657, 236; 56/473.5

[56] References Cited

U.S. PATENT DOCUMENTS

| 363,953 | 5/1887 | Alexis-Godillot | 198/661 |
|---|---|---|---|
| 1,704,731 | 3/1929 | Eggert | 198/550.1 |
| 1,767,248 | 6/1930 | Leach | 198/550.1 X |
| 3,152,702 | 10/1964 | Klemm et al. | 414/502 X |
| 3,155,288 | 11/1964 | Landgraf | 198/661 X |
| 3,265,226 | 8/1966 | Malcolm | 214/17 |
| 3,669,291 | 6/1972 | De Coene | 214/519 |
| 4,015,734 | 4/1977 | Laidig | 414/310 |
| 4,386,695 | 6/1983 | Olson | 198/661 |
| 4,717,308 | 1/1988 | Kuhns | 414/526 X |
| 5,101,961 | 4/1992 | Bengtson et al. | 198/661 X |

FOREIGN PATENT DOCUMENTS

| 0143108 | 5/1989 | European Pat. Off. . |
|---|---|---|
| 886722 | 8/1953 | Germany . |
| 2126118 | 12/1972 | Germany . |
| 2624434 | 12/1976 | Germany . |
| 3406649 | 8/1985 | Germany . |

Primary Examiner—Michael S. Huppert
Assistant Examiner—James Eller

[57] ABSTRACT

A combine grain tank has a floor and a pair of fore-and-aft feed augers above the floor for moving grain forwardly along the floor of the tank to a laterally extending trough in the forward end of the floor. A laterally extending discharge auger is mounted in the trough for moving grain laterally along the floor to an auger-type unloading conveyor exteriorly of the grain tank. The discharge auger has constant diameter flighting along its length mounted on an auger tube that has a larger diameter upstream of the point where the feed auger nearest the unloading conveyor feeds grain into the trough.

1 Claim, 2 Drawing Sheets

COMBINE GRAIN TANK DISCHARGE SYSTEM

This application is a Continuation of application Ser. No. 07/994,027, filed 8 Feb. 1993, now abandoned.

BACKGROUND OF THE INVENTION

The invention concerns a conveyor system, in particular, for the grain tank of a combine, with at least one conveyor arrangement and a conveyor housing, that is supplied at several points along the conveyor arrangement.

In order to unload large containers it is often necessary to employ a complete conveyor system that consists of several active and/or passive conveyors. In a conventional arrangement several side conveyors are provided that supply a main conveyor.

In that manner EP-B1-0 143 108 shows a conveyor system for the grain tank of a combine that contains a discharge auger conveyor and two supply auger conveyors that extend perpendicular thereto. These conveyors are driven in unison and convey the bulk material contained in the grain tank to an outlet.

In conveyor systems of this kind the problem arises that the supply conveyor located further downstream is driven constantly during the discharge process but is unable to convey the material into the discharge conveyor if the latter is filled close to its capacity, and therefore must move the material carried to the side or upward. As a result considerable wear occurs at the supply conveyor along with an increased power requirement. If the granular or bulk material in this case is wet and clumps easily, the resulting compacting can give rise to further problems in conveying.

The problem underlying the invention is seen as that of proposing a conveyor system with at least one conveyor arrangement in a conveyor housing that is supplied at several points along the direction of conveying, in which an oversupply of the conveyor arrangement in its downstream region does not occur.

SUMMARY OF THE INVENTION

This problem is solved according to the invention.

By this means the conveyed volume of the conveyor arrangement may be less in the section between an upstream supply point and a downstream supply point than it is in the downstream section, so that the volume difference due to the downstream supply conveyor can be accommodated. Since the outside dimension of the conveyor arrangement remains constant, the conveyor arrangement can convey within a housing that remains constant over its entire length, so that this can be manufactured at low cost and does not exhibit any steps or the like.

Aside from its application in the grain tank of a combine, such a conveyor system can also be employed in a silo, a bunker or other similar application, in which bulk material is to be conveyed. The supply of the bulk material into the conveyor arrangement can be performed by active and/or passive conveyors. An active conveyor could be an auger conveyor, a scraper conveyor, an elevator conveyor, a shaker outlet chute or the like. The passive conveyors could include a chute, a funnel or the like.

Depending on the number of points at which the bulk material is supplied, the conveyor arrangement can be provided with two, three or even more sections of differing conveying capacity.

The difference in the conveying capacity can be obtained, among other means, by providing several conveyors arranged in sequence one behind the other, with one conveyor conveying more than the other, and where in each case the following conveyor accepts the material conveyed. These conveyors can be configured as screw conveyors, scraper conveyors or elevator conveyors, that are accommodated in a common housing.

A differing conveying capacity can be easily obtained, for example, by operating the conveyors at differing conveying speeds, which can be achieved by means of a gear drive. In this embodiment the individual conveyors can also be operated at variable speeds, which makes possible even greater compliance with the unloading process.

Variation in the conveying capacity can also be obtained by the use of conveyors with conveying elements of different sizes, where the outside dimensions can again remain the same. The variation in the size of the conveying elements with constant outside dimensions can be achieved by a carrier, on which the conveying elements are mounted, and which varies in its outside dimensions.

A smooth transfer of material without any problems from one conveyor to a following conveyor is assured if they are supported in bearings on a common axis of rotation. Here the two conveyors can be driven from different sides or from one side only. In the latter case the drive shaft of a conveyor configured as an auger conveyor could extend through the hollow drive shaft of another auger conveyor. In a particularly advantageous arrangement the drive speed of the two conveyors can be varied with respect to each other and could be controlled depending on the characteristics of the bulk material conveyed.

If the conveyor arrangement consists of several conveyors arranged parallel to each other with differing lengths of conveyance or conveying capacity, of which one operates only over a part of the length of conveyance, for example, two auger conveyors in parallel with differing lengths of helix, then the conveying capacity can be increased at a particular point by the arrangement of the helices or the like.

In order to change conveying capacity at the various points of supply, it is also possible to use a single conveyor that is configured differently over its entire length, although its outer dimensions remain constant. This can be accomplished with an auger conveyor, in particular, by differing configurations of the auger helices, their helix angles or by a change in the diameter of the auger shaft. On the other hand, in a scraper conveyor or an elevator conveyor the inclination of the conveying elements could be varied.

If active conveyors of equal capacity, such as auger conveyors, are used to supply the bulk material to the conveyor arrangement, the conveying capacity in the various sections can be determined by the number of the supply conveyors.

The drawing shows an embodiment of the invention described in greater detail in the following.

DESCRIPTION OF THE PREFERRED EMBODIMENT

Figure 1:
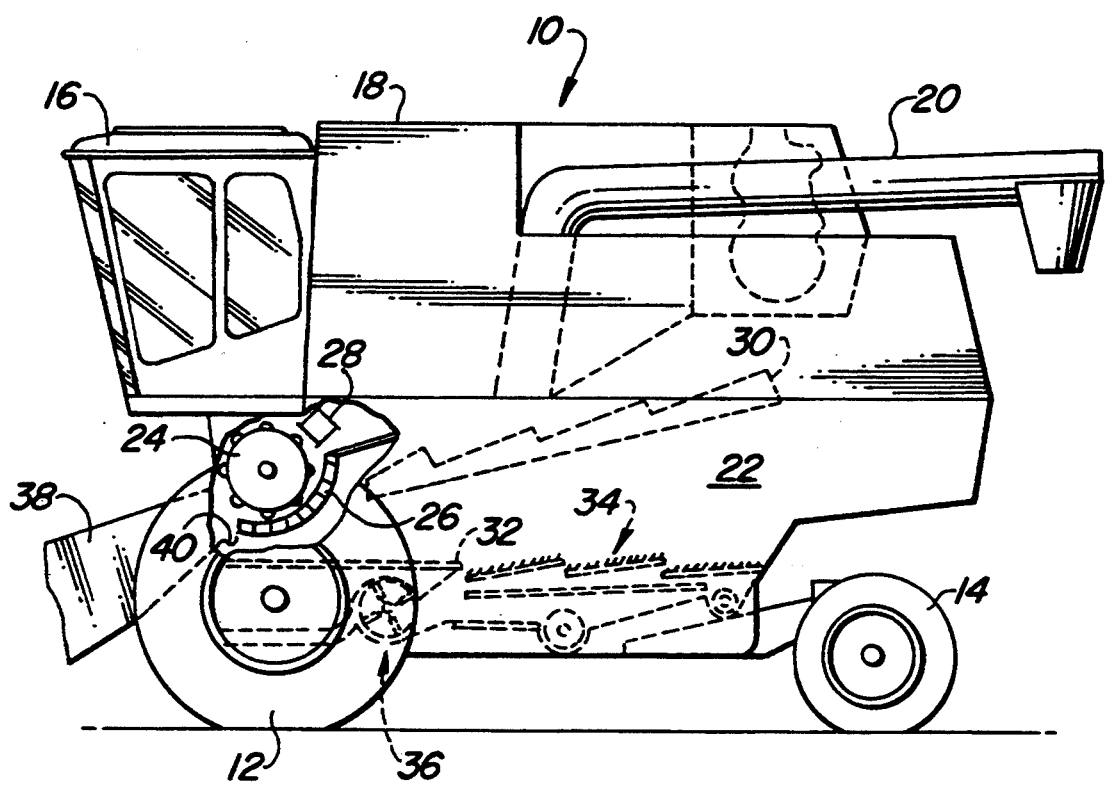
FIG. 1 shows the side view of a harvesting machine with a conveyor system according to the invention.

A harvesting machine 10 shown in FIG. 1, configured as a combine, is supported on front driven wheels 5 and rear wheels that can be steered 12 and 14, and includes an operator's cab 16 from which an operator can control the machine. Immediately to the rear of the operator's cab 16 there is a grain tank 18 from which material deposited therein can be delivered to the outside through a discharge pipe 20. The grain tank 18 is supported on a frame 22 in which the crop material supplied is separated into its large and small components as it passes between a thresher cylinder 24 and a thresher concave 26 and a beater 28. Further separation of the harvested crop is performed by the straw walker 30, the grain pan 32 and the sieves 34 as it moves further downstream. Here the fraction of the crop that has been threshed out is conveyed to the grain tank 18, while the straw and other large components are deposited on the ground by the straw walker 30 and the chaff is blown by the blower 36 from the sieves 34 to the ground. The crop is removed from the field by a crop recovery header, not shown, that delivers the crop through an inclined conveyor 38 and over a stone catcher trough 40 to the thresher cylinder 24.

Figure 2:
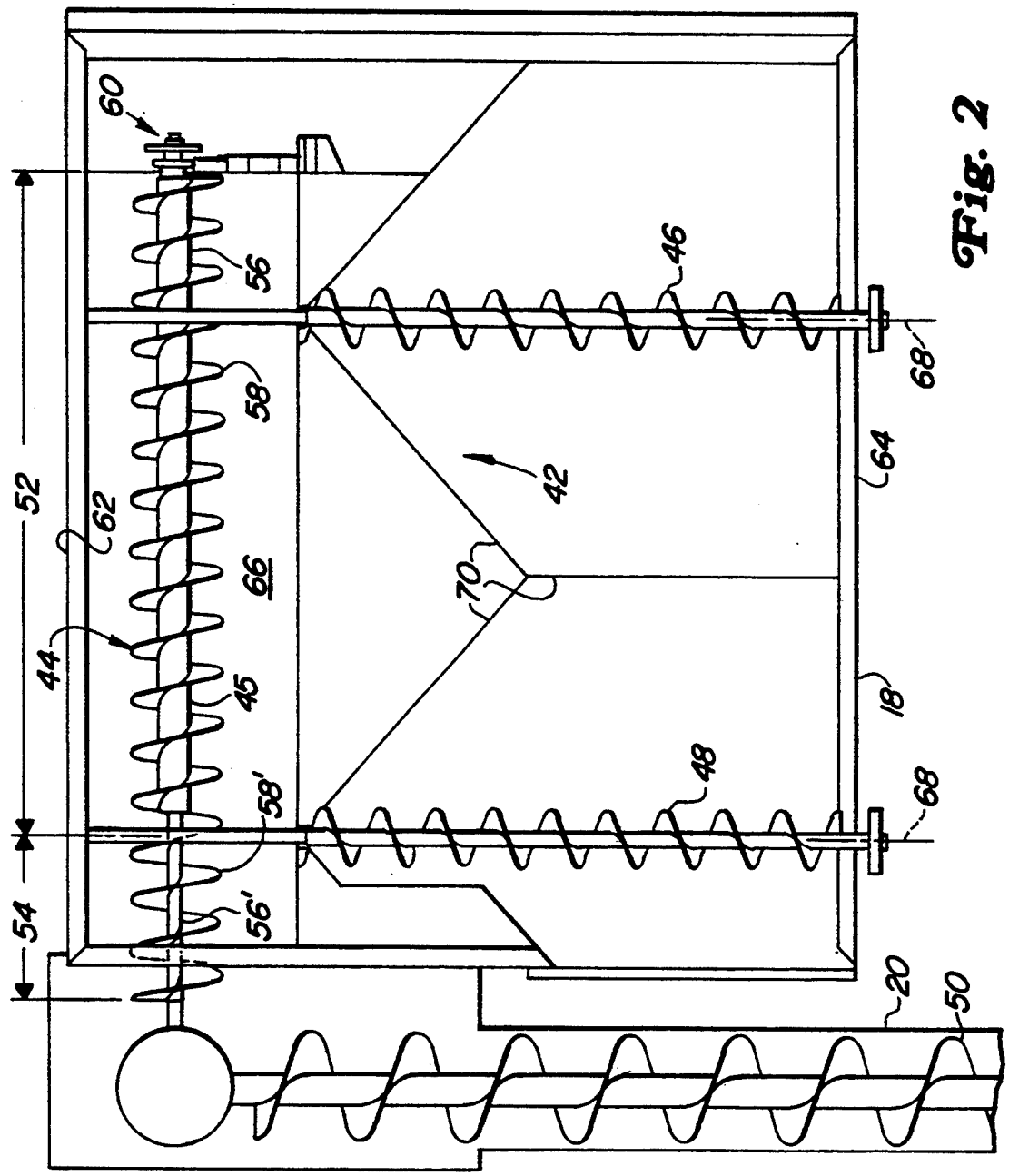
FIG. 2 shows a plan view of the conveyor system.

In the following, reference is made to the embodiment of FIG. 2 that shows a conveyor system 42 according to the invention in greater detail.

In this embodiment the conveyor system 42 according to the invention is located within the grain tank 18 and contains a discharge conveyor 44 and two supply conveyors 46, 48.

In this embodiment the conveyor 44 is configured as an auger conveyor 45 that extends over the entire width of the grain tank 18 near its bottom and whose outlet leads to the unloading auger pipe 20 which is provided with an auger conveyor 50 that takes over the flow of the crop. The conveyor 45 is configured as a one-piece unit that contains a first upstream section 52 and a second, downstream section 54. Each section 52, 54 is provided with support tubes 56 or 56' and a conveying element or flighting 58 or 58' respectively attached to the support tubes 56 and 56' each of which blends into the other or are rigidly connected to each other.

The support tubes 56, 56' are configured as coaxial cylindrical tubes having a common axis of rotation. The diameter of the support tube 56 in the first section 52 is considerably larger than that of the support tube 56' in the second section 54.

The conveyor elements 58, 58' are configured as helices of a screw, are welded to the support tubes 56, 56' and have the same outside diameter over the entire length of the conveyor arrangement 44. The floor of the grain tank below the conveyor 45 forms a trough 66, having a horizontal portion directly below the axis of the conveyor and sloping side walls. The front side wall of the trough extends upwardly and forwardly from the front edge of the horizontal portion to the front wall 62 of the grain tank 18, while the rear side wall of the trough 66 extends upwardly and rearwardly from the rear edge of the horizontal portion. A cover or hood (not shown) of conventional design overlies the conveyor 45, the bottom edges of the cover being separated from the sloping side walls of the trough in a known manner to allow the flow of material to the conveyor. The hood and trough form a housing for the conveyor that is spaced a constant distance from the conveyor and has a uniform cross section along the length of the conveyor. While the helix angle of both conveyor elements or flighting 58, 58' is the same, the radial dimension of the conveyor element 58' in the second section 54 is larger than that of the conveyor element 58 in the first section 52. This difference is based on the distance between the constant outside diameter and the differing inside diameters of the conveyor elements 58 and 58' which is determined by the diameter of the support tube 56, 56' in each of the sections 52, 54. Therefore the conveyor 45 can carry a greater volume in its second section 54 than in its first section 52.

The drive of the conveyor 45 is performed by a chain drive 60 of conventional configuration, which requires no detailed description and is shown only schematically.

In view of the rigid connection between the two sections 52, 54 of the conveyor 45, it is driven at a uniform speed, so that differing conveying capacities in the two sections 52, 54 are caused by the differing sizes of the conveying elements 58, 58'.

The transition between the first and the second section 52, 54 occurs immediately ahead of the point at which the second supply conveyor 48 supplies the conveyor 45. This second supply conveyor 48 is the one closest to the discharge auger conveyor 50. This supply point is located downstream of the supply point of the first supply conveyor 46.

Both supply conveyors 46, 48 are identical and configured as auger conveyors, and extend generally horizontally between a front wall 62 and a rear wall 64 of the grain tank 18. The supply conveyors 46, 48 are provided with screw helices only up to the bottom trough 66 of the conveyor housing that partially surrounds the conveyor 45. The auger tubes of conveyors 46 and 48 are closely offset above the conveyor 45 in the region of the bottom trough 66, so that the auger tubes can extend to the front wall 62 and are supported there in bearings.

The supply conveyors 46, 48 are driven by drives 68 that are connected to the chain drive 60 of the conveyor 45, so that a constant relationship always exists between the speeds and therewith the conveying capacity of the conveyor 45 and the supply conveyors 46, 48, so as to maintain a continuing transport of material without any friction.

The helix angle of the conveying elements 58, 58' of the conveyor 45 and that of the screw helices of the supply conveyors 46, 48 are selected in such a way that transport of material is maintained from the rear wall 64 to the front wall 62 and along the front wall to the unloading auger pipe 20.

It can be seen that with the grain tank 18 filled and with the conveyor system 42 operating, the first supply conveyor 46 located upstream delivers material to the upstream end region of the conveyor 45 and fills the enclosing conveyor volume to a maximum of 100% of capacity. This material is transported by the rotation of the conveyor 45 to the unloading auger pipe 20. At the supply point of the second supply conveyor 48, located downstream, the conveying capacity of the conveyor 45 increases suddenly, since the diameter of the tubular support 56' is considerably smaller at this point, resulting in additional conveying capacity. This increased conveying capacity is available to accept the material transported by the second conveyor 48, so that no material can accumulate at the intersection of the conveyor 45 and the second supply conveyor 48.

The bottom of the grain tank 18 can be provided with troughs in conventional manner, that accommodate the supply conveyors 46, 48 and whose walls meet at intersections 70.

In embodiments that provide three, four or more supply conveyors 46, 48, the diameter of the suppports 56, 56' of the conveyor can be stepped two, three or more times, in order to create additional conveying capacity for the material supplied at each point.

I claim:

1. A combine grain tank comprising:

a grain tank floor;

opposite side walls and opposite front and rear walls extending upwardly from the floor;

a laterally extending trough in the floor extending between the side walls adjacent one of the other walls, one of the side walls having a discharge opening at the end of the trough;

a pair of fore-and-aft feed augers, each feed auger including an axial shaft having its opposite ends respectively journaled in the front and rear walls and extending above the floor and the trough, each of the feed augers having auger flighting extending the length of the augers except for the portion above the trough, the feed augers being operative to move grain along the floor to the trough;

and a transverse discharge auger mounted in the trough and having an axial auger support tube including a first constant diameter portion and a second constant diameter portion having a substantially smaller diameter than the first portion, the second portion extending downstream from the point where the feed auger nearest the discharge opening feeds the discharge auger, and auger flighting having a constant outside diameter mounted on the first and second portions of the auger support tube.

* * * * *